Aug. 12, 1924.  
H. O. TAYLOR ET AL  
ROTARY ENGINE  
Filed April 27, 1918  
1,504,654  
4 Sheets-Sheet 4
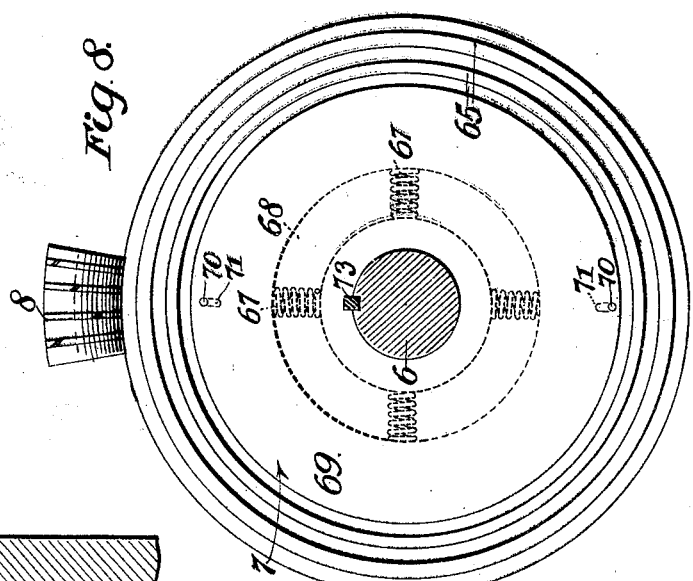
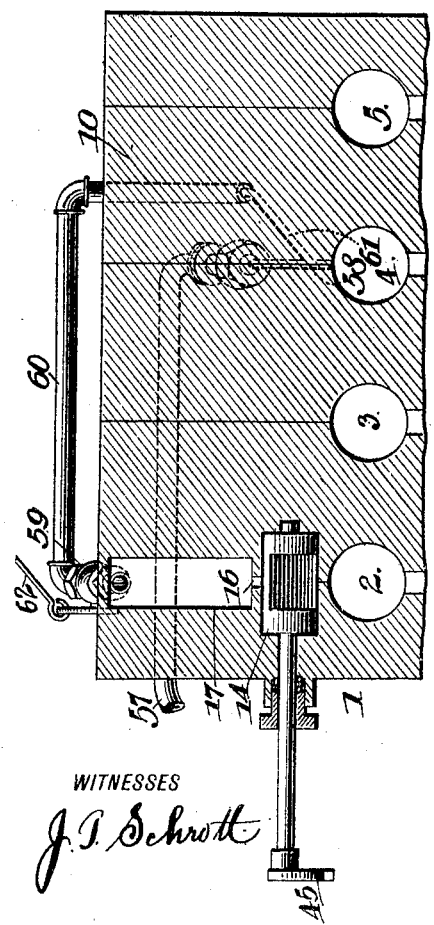
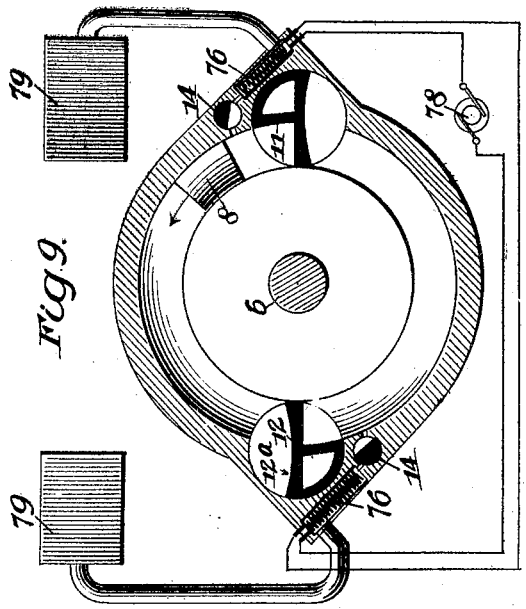
WITNESSES  
J. J. Schrott
INVENTORS  
Henry O. Taylor,  
Louis C. Brown  
BY  
ATTORNEYS Patented Aug. 12, 1924.

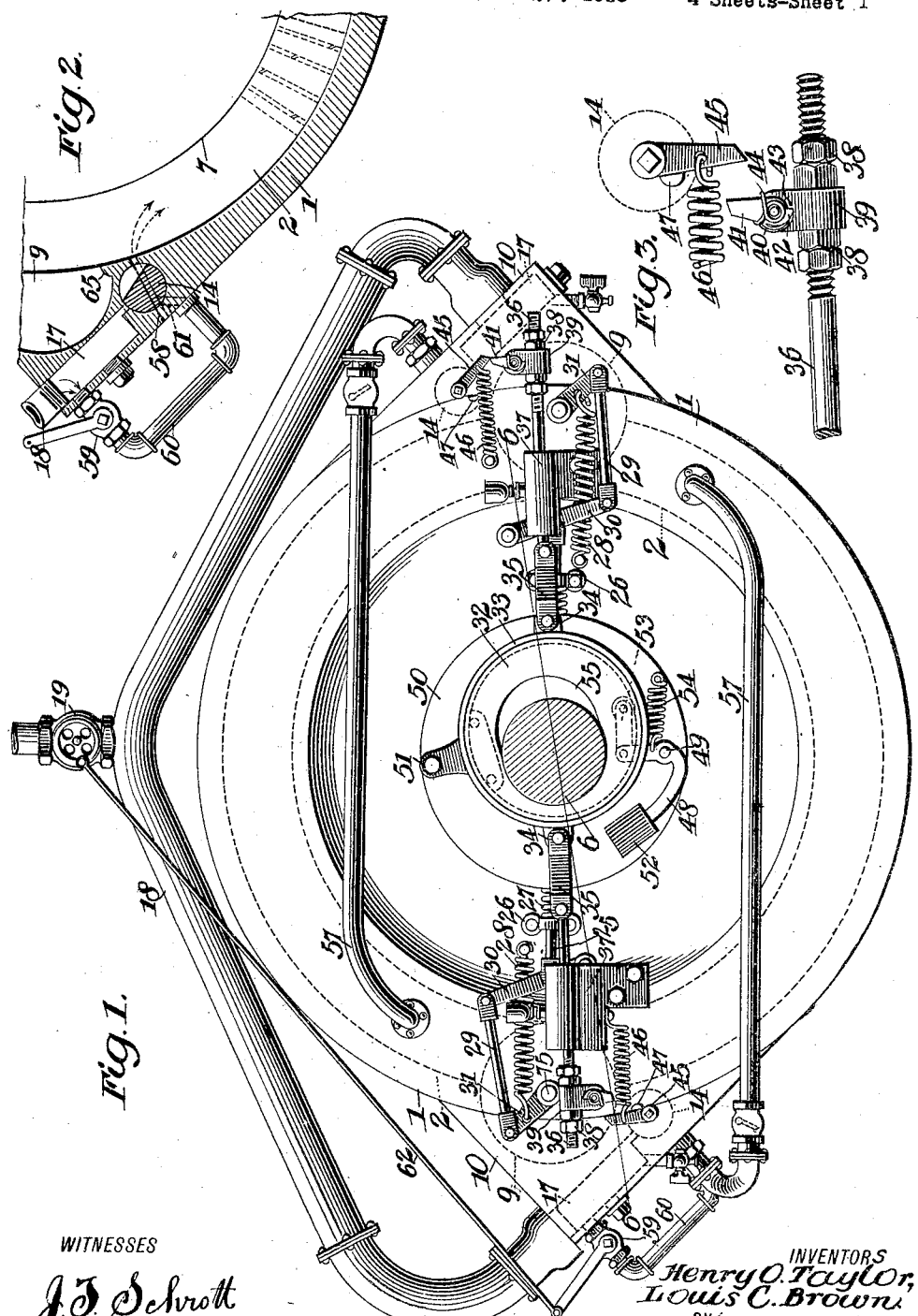

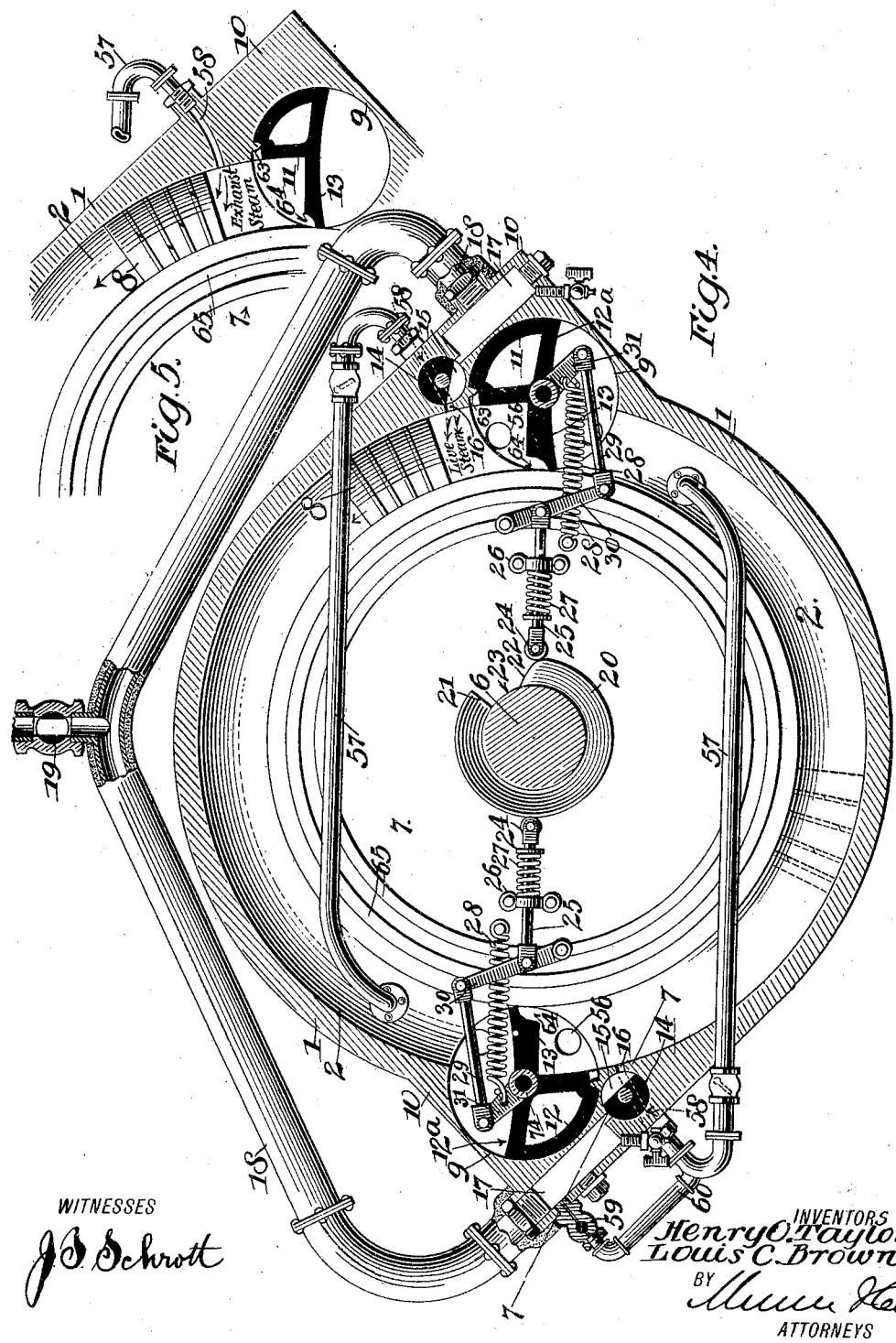

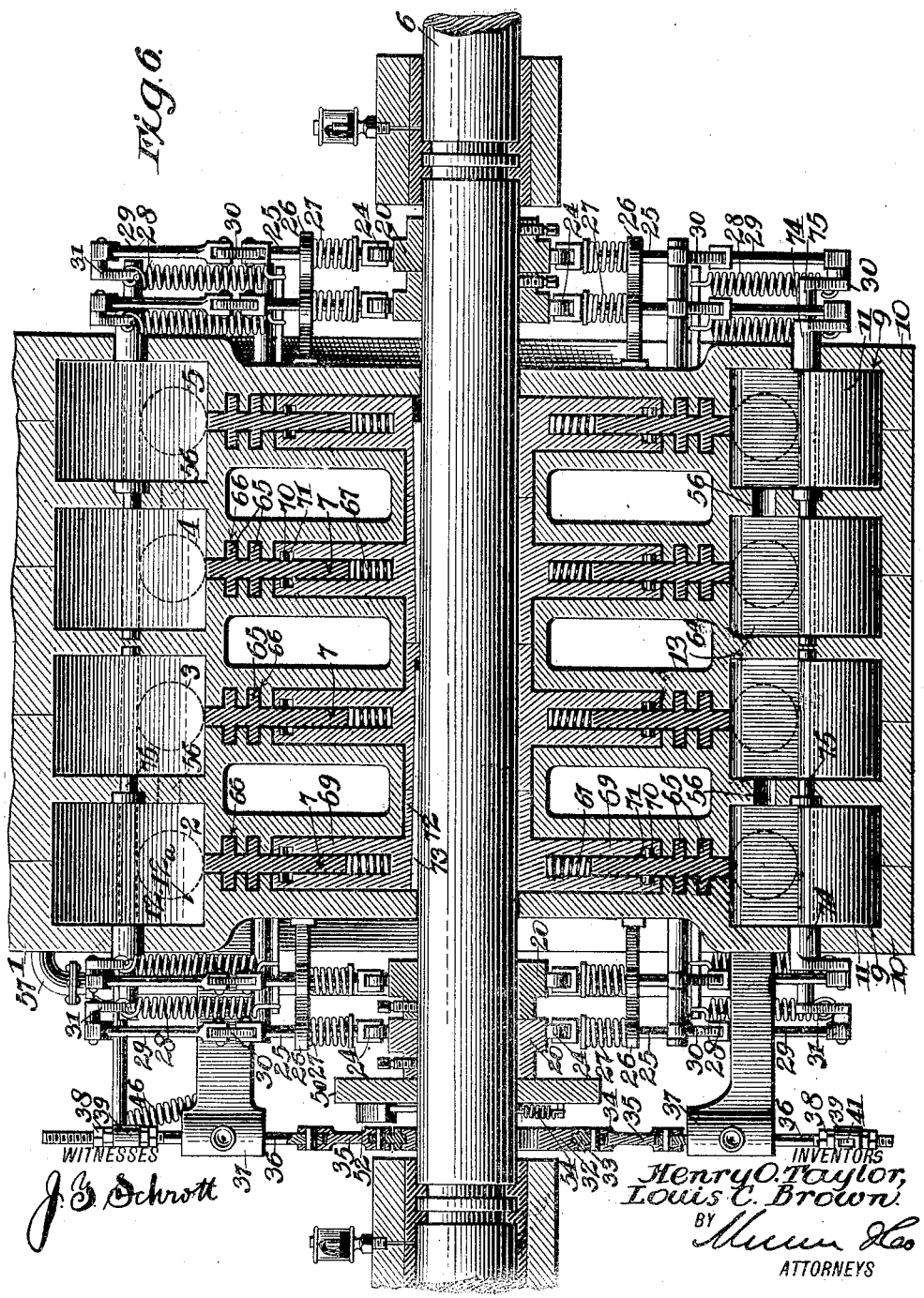

1,504,654

UNITED STATES PATENT OFFICE.

HENRY OTIE TAYLOR AND LOUIS CARL BROWN, OF WEWOKA, OKLAHOMA.

ROTARY ENGINE.

Application filed April 27, 1918. Serial No. 231,166.

*To all whom it may concern:*

Be it known that we, HENRY O. TAYLOR and LOUIS C. BROWN, citizens of the United States, and residing at Wewoka, in the county of Seminole and State of Oklahoma, have invented certain new and useful Improvements in Rotary Engines, of which the following is a specification.

Our invention relates to improvements in rotary engines, and it consists in the constructions, combinations and arrangements herein described and claimed.

An object of our invention is to provide a rotary engine applicable to drive automobiles, etc., which may be run by either steam or air, but preferably steam, the engine including a rotating piston in a circular chamber, with an arrangement of trip valves and steam valves forming cooperating abutments and means for admitting the motive fluid between the piston and said abutments.

Another object of the invention is to provide a rotary engine as described, including means for moving the trip valve to an open position and leave the circular chamber unobstructed to permit the passage of the rotating piston, should one or both of the trip rods break.

Another object of the invention is to provide a sectional rotary engine operated by either steam or air, provision being made for utilizing the further expansion of the motive fluid after it has been initially used.

Another object of the invention is to provide a governor device for reducing the speed of the engine should the speed become excessive.

Other objects and advantages will appear in the following specification, reference being had to the accompanying drawings in which:

Figure 1 is an end elevation of the rotary engine,

Figure 2 is a detail sectional view of the auxiliary starting valve,

Figure 3 is a detail view illustrating the relationship of the steam valve arm and the steam valve rod, Figure 4 is a diagrammatic sectional view of the engine the valve 59 being shown in section to illustrate its relative position when the main steam valve 19 is open, Figure 5 is a detail diagrammatic sectional view showing how the exhaust steam is employed, Figure 6 is a horizontal section on the line 6—6 of Figure 1, Figure 7 is a detail cross section on the line 7—7 of Figure 4, Figure 8 is a detail view of one of the rotors, and Figure 9 is a detail diagrammatic view of a modification showing how electrically heated compressed air may be used to run the engine.

In carrying out our invention we provide a casing 1 which is made in sections as shown in Figure 6. In the present instance there are five sections to the casing providing four circular chambers 2, 3, 4 and 5. This plurality of circular chambers is provided so that all of the energy of the motive fluid may be expended on the rotating piston before the fluid is finally exhausted, and the purpose of the sectional casing is, to permit the elimination of the intermediate sections so that only the first circular chamber 2 need be employed should it be desired to run the engine as an ordinary rotary engine wherein the remaining power of the exhaust motive fluid is not utilized.

Mounted on the shaft 6 is a plurality of rotors 7, each of which is of a special construction as illustrated in Figure 8, and has a rotating piston 8 which moves in the circular chamber of the respective units or sections of the casing. The upper and lower half of each circular chamber of the casing is an independent working chamber so far as the driving of the rotating piston 8 is concerned. In this connection attention is directed to Figure 4, which is a diagrammatic view and illustrates the relationship of the working parts of the first circular chamber 2.

Located in valve recesses 9 in enlargements 10 which are formed on the casing 1, are trip valves 11 and 12. The body portion of each trip valve is arcuate in shape to conform to the semi-circular valve recess 9 in which the trip valve moves. An abutment 13 extends into the circular chamber 2 from the trip valve and normally closes the circular chamber so that it provides an abutment or closure when the motive fluid is admitted between said abutment and the receding rotating piston 8.

A stem valve 14 located adjacent to each of the trip valves, has a port 15 arranged to be moved into registration with a passage 16 which provides communication between the recess of the steam valve and the circular chamber 2 immediately above and below the abutments 13 of the respective trip valve on the right and left hand sides in Figure 4. A steam chest 17 in each of the enlargements 10 communicates with the recess of the steam valve 14 and has a steam pipe 18 in connection therewith. The steam pipe 18 reaches from each of the steam chests 17 across the top of the casing 1 where it combines with a main steam valve 19 which is manually controlled to admit steam to the respective steam chests and run the rotary engine.

Before explaining the action of the steam valves and while Figure 4 is under consideration, the manner of operating or tripping the trip valves 11 and 12 to permit the passage of the rotating piston 8 should first be understood. A cam 20 is secured to the shaft 6 and is arranged to operate the diametrically opposite trip valves in regular order. There is a double pair of cams 20 on the shaft 6 at each end of the engine as is more clearly shown in Figure 6, but since the action of each cam is precisely alike, the operation of one with respect to a pair of the trip valves will be first explained, and the function of the pairs of cams will be described later. The cam 20 has an abrupt wall 21 and an inclined wall 22 providing a recess 23 into which the roller 24 on the end of a trip rod 25 is adapted to fall and suddenly open the passage in the circular chamber for the rotating piston 8 by moving the abutment 23 of one or the other of the trip valves out of the way.

A bracket 26 supports the trip rod 25 and provides an abutment for one end of a spring 27 on the trip rod, the other end of the spring bearing on a washer. The primary purpose of the spring 27 is to keep the roller 24 in contact with the periphery of the cam 20, but since another and more powerful spring 28 is provided for another purpose, the spring 27 is ordinarily not required and might be dispensed with. The purpose of the spring 28 is to pull or move the trip valve to the retracted position in the valve recess 9 to leave the passage for the piston 8 in the circular chamber 2 open, in the event of the breakage of the trip link 29 which is connected between the trip lever 30 and the trip arm 31 on the trip valve.

For this purpose one end of the spring 28 is attached to the trip arm 31 and obviously should the trip link 29 break for any reason, the spring 28 will quickly move the abutment 13 out of the circular chamber 2 so that the piston 8 may continue its rotation without obstruction. Here it will be seen that the spring 27 on the trip rod 25 is necessary to keep the roller 24 in contact with the cam 20, because were it not for the spring 27, the trip lever 30 would hang loose and the trip rod 25 would be loose, presenting a condition which it is desirable to avoid.

The outer end of the trip rod 25 is pivoted to the trip lever 30 and the trip lever itself is journaled on a suitably arranged support on the casing 1 of the engine. So far as described, it will be readily understood that as the shaft 6 and its carried parts rotate in the counter-clockwise direction indicated in Figure 4, the trip valve on each side will move to let the piston 8 pass at the proper time. This movement of the trip valve occurs when the recess 23 in the cam 20 reaches the roller 24. The roller 24 falls down into the recess adjacent to the abrupt wall 21 whereupon the abutment 13 is suddenly retracted from the circular chamber 2 principally by the action of the spring 28. No sooner does the piston 8 pass the region of the abutment 13 than does the roller 25 ride up the incline 22 and move the abutment 13 back into the circular chamber 2 to close the space behind the piston. The steam valve 14 is now opened so that steam is admitted to the space between the head of the piston 8 and the abutment 13, and the piston 8 is driven forwardly in the direction indicated.

An eccentric 32 operates the steam valve 14. The eccentric has a strap 33 with ears 34 on diametrically opposite sides, to each of which a link 35 of a steam valve rod 36 is attached. Each steam valve rod 36 slides in a bearing 37 and is threaded on the outer extremity to receive the binding nut 38 by means of which a base 39 is adjusted and held in position. The base 39 has a dog recess 40 in which a dog 41 is pivoted. The dog 41 has a heel 42 which is normally pressed against a stop 43 by a spring 44, and thus the dog 41 normally remains in the position indicated in Figures 1 and 3 so that it may properly strike and move the arm 45 on the shaft of the steam valve 14.

Attached to the arm 45 is a spring 46 which normally holds the arm 45 against a stop 47 and the valve 14 closed with respect to the communication of the port 15 in the valve to the small steam passage leading from the adjacent steam chest 17. It is not until the dog 41 is moved outwardly against the arm 45 to displace it in the position indicated in Figure 1, that the port 15 in the valve 14 uncovers the small steam passage just referred to, and opens communication between the steam chest and the passage 16 leading into the circular chamber 2. Both steam valves are operated in the same manner by the eccentric 32 as will readily appear in Figure 1 without further explanation, it being sufficient to say that the eccentric reciprocates the steam valve rods 36 so that the arms 45 of the respective steam valves 14 are alternately tripped to introduce steam into the circular chamber 2 at exactly the proper moment to introduce steam between the piston 8 and the adjacent abutment 13 and keep the engine in operation.

Excessive speed of the engine is prevented by means of a governor device associated with the eccentric 32, which consists of an arm 48 pivoted at 49 to a disk 50 on which the eccentric 32 is pivoted at 51. The arm 48 has a weighted end 52 and is connected at the other side of the pivot 49 to the eccentric 32 by means of a link 53. A spring 54 normally counteracts the tendency of the weight 52 to fly outwardly under the influence of the centrifugal force, but when the speed of the engine becomes excessively high, the weight 52 flies outwardly against the tension of the spring 54, and the arm 48 through the medium of the link 53 rocks the eccentric 32 on its pivot 51 into a concentric relationship with the shaft 6. For this purpose, the eccentric 32 has an elliptical opening 55 through which it will be seen the shaft 6 projects. When the eccentric 32 becomes concentric to the shaft 6 no reciprocating motion of the steam valve rod will follow and consequently the steam valves 14 will cease to operate. When steam is no longer admitted to the circular chamber 2, the piston 8 simply revolves through its own momentum, thus reducing the speed of the engine until it becomes sufficiently slow to enable the weight 52 to again move inwardly under the influence of the spring 54 when the eccentric 32 again moves toward its normal position.

Passages 56 between the pairs of circular chambers 2, 3 and 4, 5, admit equal quantities of the motive fluid to these pairs of chambers. The exhaust steam from the first pair of chambers is conducted to the second pair through exhaust steam pipes 57 which communicate at one end with the first pair of circular chambers near the trip valve as illustrated in Figure 4. The other end of each steam pipe 57 communicates with a duct 58 formed in the enlargement 10 and which leads into the circular chamber 4 of the exhaust pair. The exhaust steam is distributed between the exhaust circular chambers 4 and 5 by the communicating passages 56 which are illustrated in Figure 6. After the piston 8 has moved around to a position where it uncovers the inlet to the exhaust pipe 57 in the top half of the circle in Figure 4, the partly spent steam behind the piston will pass through the pipe 57 and enter the exhaust pair of chambers 4 and 5. The pistons 8 of this pair of chambers are a little more than a quarter behind the pistons 8 in the chambers 2 and 3, and will thus be in the correct position with respect to the duct 58 to receive the full benefit of the exhaust steam when the entrance to the pipe 57 is uncovered as just explained.

To provide against the contingency of the engine refusing to move should the piston 8 in the first chamber 2 pass over the passage 16, an auxiliary starting valve 59 is provided in a pipe connection 60 which joins the steam chest 17 on the right side with a duct 61 leading to the duct 58 (Fig. 7). The auxiliary starting valve 59 is controlled from the main inlet valve 19 by either joining the rod 62 which reaches to the handle on the valve 59, with the handle of the valve 19 on to a separate lever. Either way may be employed but the purpose is to open the valve 59 and admit live steam from the steam chest 17 to the first of the exhaust pair of chambers 4 so that the engine may be started should the passage 16 be covered. It is of course undesirable to have the auxiliary valve 59 open all the time and in the event that the rod 62 is connected directly to the handle of the valve 19, the arrangement is such that on initially opening the valve 19 the auxiliary valve 59 will be opened to admit the steam as stated, whereupon on opening the valve 19 further the auxiliary valve will be again closed, this occurring by reason of the further turning of the handle of the valve 19.

Attention is directed more particularly to the construction of the trip valve. It will be observed in Figure 4 that each of the trip valves is concave at $12^a$ on the surface below the abutment 13 at the right of Figure 4. The center of curvature of the concavity is the same as that of the outer periphery of the circular chamber 2 so that when the trip valve 11 is turned 90 degrees to the right, the concavity of the trip valve will aline with the chamber 2 and permit the piston 8 to pass.

In order that the pressure of the steam between the abutment 13 and the forwardly moving piston 8 may not drive the abutment 13 downwardly, a lug 63 is provided at the top of the recess 9 and engages a similarly formed recess in the upper edge of the body of the trip valve 11. A recess 64 in the upper edge of the abutment 13 permits the closing of the abutment upon the lug 63 when the trip valve is moved to the open position. The contacting edge of the abutment 13 near the recess 64, with the periphery of the rotor 7 is in actual practice, very small and is equal in width only to that of the thickness of the rotor. The valve recess 9 itself is relatively large and a comparison between the relative sizes of the circular chamber 2 and of the recess 9 may readily be made by referring to Figure 6.

Reference has been made to Figure 8 wherein the particular construction of one of the rotors 7 is shown. This view when taken in connection with Figure 6, shows each rotor 7 to have a plurality of annular ribs or flanges 65 which play in correspondingly shaped grooves 66, in the adjacent walls of the casing sections. The rotor 7 is in the nature of a ring and is supported on stout coil springs 67 in the space 68 between the side plates of a rotor support 69. The principal function of the springs 67 is performed when the engaging parts 65 and 66 become worn to such an extent that there is a certain amount of looseness therebetween, and when this condition occurs, the springs 67 tend to take up the shock of any vibration that may result.

Pins 70 on the rotor 7 engage slots 71 in the side plates 69 and prevent relative turning of the rotor 7 and the side plates. The rotor support 69 has hubs 72 which bear on the shaft 6, and are keyed in place as indicated at 73 in Figure 6. While Figure 6 is now under observation, it should be observed that the double arrangement of the cams 20 at each end of the engine includes means for separately adjusting the cams. Ordinarily the recesses 23 in all of the cams are in alinement so that the trip valves 11 and 12 operate in unison.

It must not be confused however, that the trip valves for the exhaust chambers 4 and 5 operate in unison with the trip valves of the live steam chambers 2 and 3. The operation of the former trip valves is delayed sufficiently to accord with the posteriorly located pistons of the exhaust rotors. Should it be desired to run the pistons otherwise than in pairs, the cams 20 may be shifted so that the respective trip valves operate according to the positions of the pistons.

A sleeve 74 forms the fulcrum for the trip valves 11 and 12 of the outer chambers 2 and 5. Rods 75 pass through these sleeves and provide the fulcrums for the trip valves of the inner chambers 3 and 4. The trip arms 31 are attached to the respective sleeves and rods 74 and 75 as clearly shown in Figure 6. Obviously a single operating mechanism for each pair of the trip valves might be employed in lieu of the duplicate operating mechanism illustrated in Figure 6, were it not for the possibility of making a different adjustment for the various trip valves. When such an adjustment is made, a separate operating mechanism for each trip valve becomes necessary.

A motive fluid other than steam may be used to drive the rotary engine. An arrangement for using electricity and compressed air is shown in Figure 9. Resistance coils 76 are placed in the steam chests 17 by removing the plugs 77 and suitably insulating the resistance coils from the metallic walls of the steam chest. A suitable source of electric current 78 heats the resistance coils 76 to incandescence thus augmenting the energy of the compressed air from the containers 79. In other respects, the engine shown in Figure 9 operates just the same as does the engine shown in Figure 4, the only difference being in the mode of generating and supplying the motive fluid.

Minor details of construction, such as the arrangement of a pedestal or support for the engine casing 1, and the showing of oil cups at all of the places that require lubrication, have been omitted from the drawings. It is to be understood that in actual practice, these parts are to be supplied and arranged in such a manner as may best suit the purpose.

While the construction and arrangement of the rotary engine as illustrated in the accompanying drawings is that of a generally preferred form, obviously modifications and changes may be made, without departing from the spirit of the invention or the scope of the claims.

We claim:—

1. A rotary engine comprising a casing having a live steam chamber and an exhaust steam chamber, rotors in the chambers having pistons in disalinement, a steam valve controlling the passage of steam to the live steam chamber, a steam chest communicating therewith, a steam pipe connected to the steam chest, a main steam valve in said pipe, a pipe connection between the steam chest and the exhaust steam chamber, an auxiliary steam valve in said pipe connection, and connecting means between said auxiliary valve and main steam valve for initially opening the auxiliary valve upon opening the main steam valve to conduct live steam from the steam chest to the exhaust steam chamber and insure the starting of the engine should the piston in the live steam chamber stop across the steam valve, said auxiliary valve being closed upon further opening of the main steam valve.

2. In a rotary engine, a shaft, a casing receiving the shaft and having a plurality of concentric grooves, a rotor mounted on the shaft and including a plurality of concentric rings occupying the grooves, a rotor support fixed on the shaft and consisting of side plates forming a space to receive the rotor, a plurality of springs interposed between the rotor and the rotor support in said space, and a pin and slot connection between the rotor and support.

3. A rotary engine comprising a casing having live and exhaust steam chambers, a rotor and piston operable in each chamber, an enlargement formed on the casing having a steam chest, a valve for controlling the passage of steam from the chest through the live steam chamber, a steam pipe for conducting the steam through the same, a valve in said pipe having a handle for controlling the steam, a pipe connection between the steam chest and the exhaust chamber, an auxiliary valve in said connection, and a rod connecting the main and auxiliary valves to cause the opening of the auxiliary valve with the initial opening of the main valve so that steam enters both chambers, said auxiliary valve closing upon further opening of the main valve so that the supply of live steam to the exhaust chamber is cut off.

4. A rotary engine comprising a casing having live and exhaust steam chambers, a rotor having a piston in each chamber, an enlargement formed on the casing having a steam chest, a valve to control the flow of steam from said chest to the live steam chamber, a pipe to supply said chest with steam, a pipe connection furnishing communication between the chest and the exhaust steam chamber, a main valve in the steam pipe having a handle, a rod so connected to said handle as to make a turn of short radius, and an auxiliary valve in said pipe connection having a long handle to which the other end of said rod is connected to make a turn of long radius when the main steam valve is opened, the continued opening of the main steam valve causing the subsequent closure of the auxiliary valve to cut off the flow of steam to the exhaust chamber.

5. A rotary engine having a shaft, a casing composed of sections each having a plurality of grooves facing each other when the sections are placed in confronting positions, a rotor adapted to occupy a place between the sections and having a plurality of rings fitting in the various grooves, a rotor support carried by the shaft and consisting of side plates receiving the rotor, a plurality of springs interposed between the rotor and the rotor support, and a pin and slot connection between the rotor and support.

HENRY OTIE TAYLOR.
LOUIS CARL BROWN.